United States Patent [19]

Karzmer

[11] Patent Number: 4,666,539
[45] Date of Patent: May 19, 1987

[54] METHOD OF MAKING A FLOORING MATERIAL

[76] Inventor: David L. Karzmer, 58 S. Cadillac Dr., Youngstown, Ohio 44512

[21] Appl. No.: 843,241

[22] Filed: Mar. 24, 1986

[51] Int. Cl.$^4$ .................. B32B 31/12; B32B 31/22; B32B 35/00
[52] U.S. Cl. ..................... 156/94; 156/153; 156/264; 156/311
[58] Field of Search .............. 156/94, 153, 256, 264, 156/311; 15/216, 217

[56] References Cited

U.S. PATENT DOCUMENTS

| Re. 24,937 | 2/1961 | Leo | 156/94 |
|---|---|---|---|
| 2,338,828 | 1/1944 | Weiner | 15/217 |
| 3,037,898 | 6/1962 | Zumofen | 156/94 |
| 3,352,733 | 11/1967 | Kruce | 156/94 |
| 4,082,874 | 4/1978 | Traylor | 156/94 |

Primary Examiner—Donald E. Czaja
Assistant Examiner—J. Davis
Attorney, Agent, or Firm—Harpman & Harpman

[57] ABSTRACT

Flooring material useful in many environments is formed of a plurality of strips of used automobile and/or truck tire casings by an improved method wherein all of the original tread rubber remaining on the used tire casing and the belt plies which extend circumferentially of the tire casing along with the outer rubber or resilient material and the inner graphite-carbon rubber or resilient material of the tire casing are removed and strips of the remaining body of the tire casing are abraded to expose the tire cords of the body plies. The strips are then assemblied in side by side relation and bonded to one another and cut into appropriately sized flooring "tiles". The novel method insures bonding of the strips to one another by forming the strips of the inner portions of the body plies of the tire casing with uniform rubber or resilient material surfaces and further insures the successful bonding of the completed flooring material to a concrete floor or the like.

5 Claims, 7 Drawing Figures

METHOD OF MAKING A FLOORING MATERIAL

BACKGROUND OF THE INVENTION

1. Technical Field

This invention relates to a flooring material of extremely durable materials that provide a long wearing, inexpensive floor covering and more particularly the method of making the same from used tire casings.

2. Description of the Prior Art

Prior flooring material of this type has been proposed and methods for making the same may be seen in U.S. Pat. Nos. 3,037,898 and 3,352,733. A somewhat similar form of flooring is seen in U.S. Pat. No. 4,408,365 and in my co-pending patent application Ser. No. 06/631,323 filed July 16, 1984.

In U.S Pat. No. 3,037,898, a tire casing is cut into a continuous strip which is beveled, the strip being wound into a coiled body and a plurality of such coiled bodies arranged in side by side relation and the strips removed therefrom and bonded to one another and the resulting assembly abraded on one of its surfaces to provide a nap or pile-like surface.

U.S. Pat. No. 3,352,733 cuts narrow strips from a used tire casing, abrades the strips to leave exposed a portion of the cords extending upwardly from the same to form a carpet pile and assembles a plurality of the strips in side by side relation and bonds the bottom surfaces of the strips by a suitable adhesive to a backing sheet.

U.S. Pat. No. 4,408,365 positions strips cut from used tire casings alternately between strips of rigid materials and attaches the same mechanically thereto and my co-pending patent application discloses abrading a used tire casing to remove some of the rubber or resilient material therefrom and expose the tire cords so as to form a pile-like surface and then the cutting strips of the casing to form smooth, even sides and bonding the same together with a suitable adhesive to form a finished flooring unit. Commercial production of the flooring disclosed in my co-pending application encountered problems in the formation of the flooring "tiles" not anticipated in my co-pending application or in the prior art references and specifically the major problem of obtaining suitable bonding of the strips of used tire casing to one another due to the inability of the state of the art adhesives to bond the widely differing rubber, synthetic rubber, or resilient materials to one another and particularly where the outer rubber or resilient material of the tire casing differs substantially from the usual graphite-carbon-rubber or resilient material compound used as the inner layer of a tire casing.

Additional problems arose through the differences in the tread compounds and the materials used therein which resulted in discarding a very substantial percentage of the carpet "tiles" formed in accordance with my co-pending application for patent or the prior art references.

In the present invention, the strips used in forming the flooring material comprise elongate sections of the body of the used tire casing including the body plies and rubber or resilient material and the plies of tire cords and/or tire cord fabric.

The present invention thus relates to the formation of the strips of used tire casings being taken from within the actual body of the used tire casing where the rubber and/or resilient material in which the body plies of the casing are embedded is a uniform compound with the result that a state of the art adhesive such as alkyl 2-cyanoacrylate can and does form a permanent bond between the sides of the strips so as to form a permanent assembly thereof of a desired width and length such as twelve inches by twelve inches. The permanent bonding thus achieved by the present method of insuring that the surfaces of the strips being bonded are of uniform rubber and/or resilient material compound results in the unusual and highly desirable ability of the adhesive to permanently bond the strips to one another which also makes it possible to permanently bond the finished flooring "tiles" directly to a cement floor or the like and retain the highly desirable resilient, flexible nature of the flooring material.

SUMMARY OF THE INVENTION

A method of making a flooring material consists of removing all of the tread rubber, belt plies, the outer layer of rubber and the inner layer of rubber incorporating graphite-carbon and the like from a used tire casing so as to leave the body of the tire casing incorporating the body plies thereof and the uniform rubber and/or resilient material compound thereof and then cutting strips of the remaining body so formed, abrading the strips to expose a desirable amount of the body plies and bonding the strips to one another with the body plies resulting from the abrading forming the wearing or pile surface thereof, so as to create a relatively thin, highly flexible piece of flooring material having the surface thereof opposite the pile of the same compound as the sides thereof previously bonded to one another so that said surface can be permanently bonded to a supporting surface such as a concrete floor or the like.

DESCRIPTION OF THE PREFERRED EMBODIMENT

Figure 1:
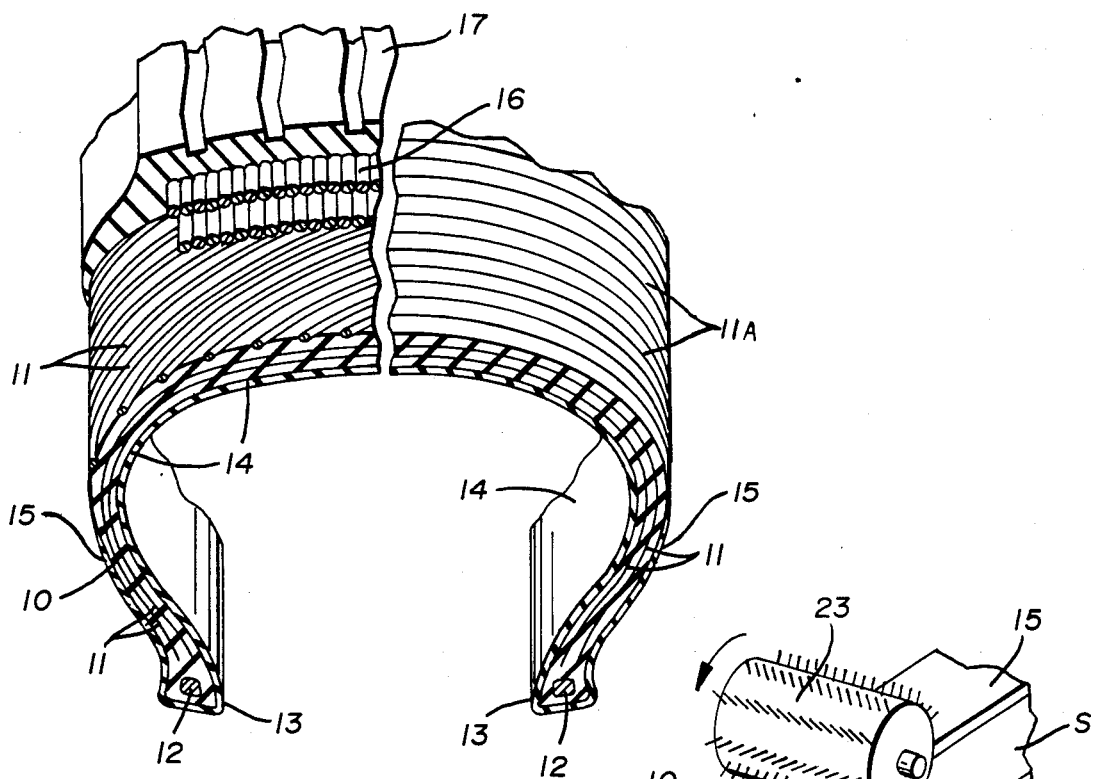
FIG. 1 is a composite perspective view of a cross section of a used tire casing, the left half of the Figure illustrating the tread rubber, the belt plies, bias body plies and an exterior rubber and/or resilient material finishing layer and an interior graphite-carbon rubber and/or resilient material inner surface layer, the right half of FIG. 1 showing the remaining body of the casing after the tread rubber, belt plies, and outer and inner surface layers are removed therefrom.

By referring to FIG. 1 of the drawings and the left side of this composite Figure, it will be seen that a vertial section through a portion of a used tire casing is illustrated and wherein the initially formed body of the casing is illustrated by the numeral 10, the body incorporating body plies 11 usually alternately arranged with rubber and/or synthetic material layers of the same desirable uniform compound. The opposite ends of the tire casing are defined by the wire beads 12 which are enclosed in the circumferential edges 13 of the tire casing body 10 at the time of manufacture by the turnover bladders of the tire building machines. A layer 14 of rubber and/or resilient material that forms the inner surface of the tire casing body 10 commonly incorporates graphite or another form of carbon and a layer 15 of rubber and/or resilient material which forms the outer surface of the tire casing body 10 is commonly a rubber compound chosen for its ability to form a smooth, attractive, uniform outer surface of the tire casing in which the various indicia, such as names and sizes, etc., are formed when the casing is held by the inner bladder of the tire building machine against the mold during vulcanization. The inner and outer surfaces of the finished tire casing are thereby formed by the inner layer 14 and the outer layer 15 as heretofore described which are of different compounds and generally different from the compound of the actual body 10 of the casing as heretofore described.

During the formation of a tire casing, the belt plies 16, usually of several layers, are applied over the appropriate areas of the body 10 and usually in close proximity if not directly on the body plies 11 which may be bias ply material or radial material as known in the art.

In the left half of FIG. 1 of the drawings, bias plies 11 are illustrated and on the right half of FIG. 1 of the drawings, radial plies 11A are illustrated. After the application of the belt plies 16 the tread rubber layer 17 is applied whereupon the tire casing being formed which is then in an elongated cylindrical shape on an appropriate mandrel is placed in a mold and the inner and turnover bladders of the tire forming machine inflated, the inner bladder moving the assembled materials into the finished shape of the tire casing whereupon the compounds are vulcanized usually by the heat from steam introduced into the molds as known in the art.

Vulcanization of the rubber and/or synthetic rubber compounds results in an integral tire casing incorporating the various body plies 11 either bias or radial, the belt plies 16, and the relatively thick tread rubber 17 and the inner and outer surface layers 14 and 15.

Figure 2:
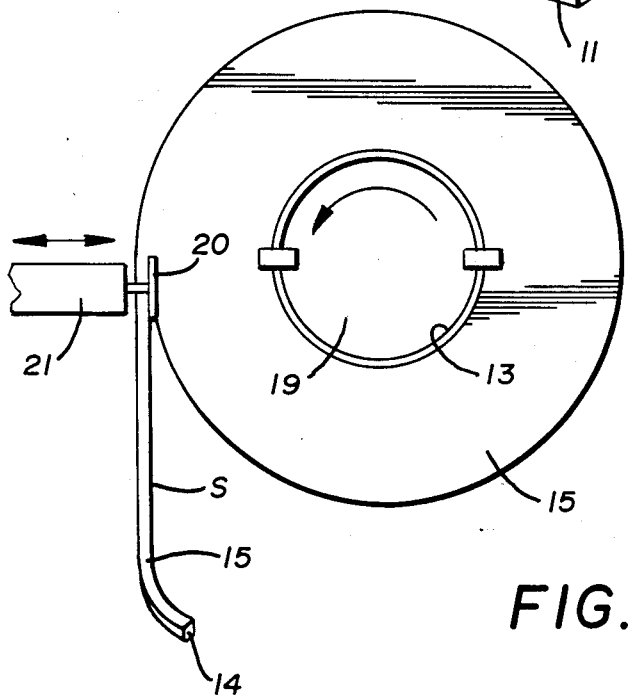
FIG. 2 is a schematic top plan view of a rotary table and a knife engaged on a half section of the tire casing body cutting a continuous strip therefrom.

In the present invention, the tread rubber 17, the belt plies 16 and the inner and outer layers 14 and 15 respectively are removed from the used tire casing body 10 by first abrading the used tire casing to remove the tread rubber 17 and the belt plies 16 whereupon the entire casing which in section is of an inverted U-shape is then cut in half and each of the circular halves thus formed placed on a rotatable table 19 as diagrammatically illustrated in FIG. 2 of the drawings and flattened out and rotated while a suitable knife 20 on an axial movable support 21 cuts a strip illustrated at S in FIG. 2 continuously in a spiral cut to form an elongated strip, the upper surface thereof comprising the outer layer 15 as heretofore described and the lower surface 14 thereof comprising the inner surface of the casing as heretofore described. The sides of the strip as seen in FIG. 2 of the drawings, thus have longitudinal sections of the compound of the body 10 and longitudinal sections of the compounds 14 and 15 spaced by the compound of the original body 10.

Figure 3:
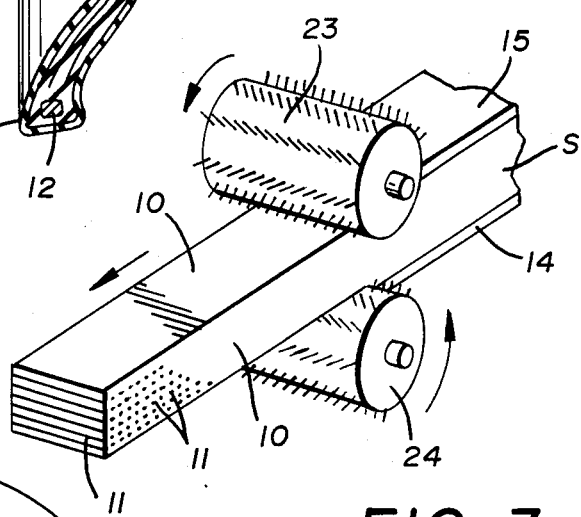
FIG. 3 is a perspective diagrammatic view of devices for removing rubber and/or resilient material from the original outer and inner sides of the strip formed from the tire casing by the apparatus show in FIG. 2.

The strips as thus formed and described are then subjected to further abraiding as diagrammatically illustrated in FIG. 3 of the drawings wherein oppositely rotating vertically spaced abrading rollers 23 and 24 and means not shown for rotating them are engaged on the strip S so as to remove the longitudinal section 15 of the outer layer compound and the longitudinal section 14 of the inner layer compound leaving the body 10 compound with the body plies 11 positioned transversely thereof. The resulting strip S is then turned a quarter turn from its position as illustrated diagrammatically in FIG. 3 of the drawings to the position illustrated diagrammatically in FIG. 4 of the drawings and where it is subjected to a further abrading action by another abrading roller 25 engaging one of the sides of the strip S as conditioned by the oppositely disposed counter rotating abrading rollers 23 and 24 of FIG. 3 of the drawings.

Figure 4:
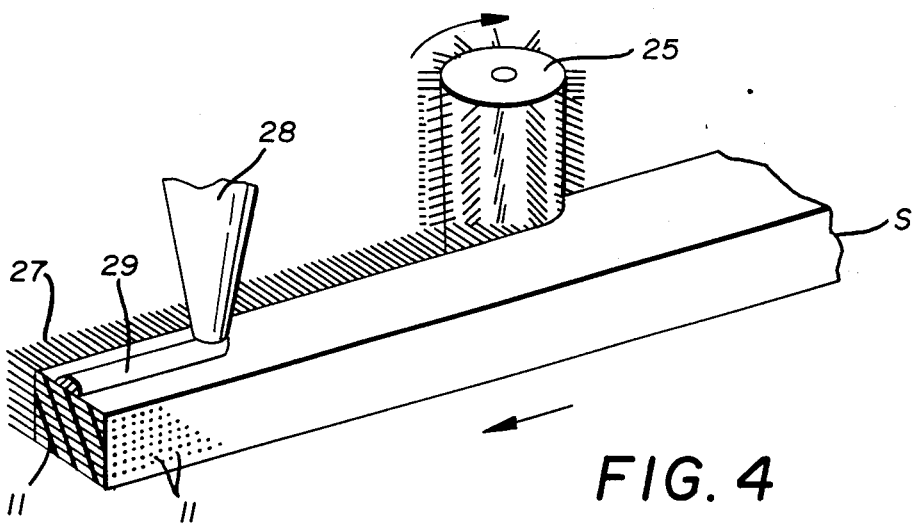
FIG. 4 is a perspective diagrammatic view of a portion of the strip of tire casing formed in accordance with FIG. 3 and illustrating a device for abrading one surface of the tire casing strip to expose the body plies and showing a device for applying an adhesive to another surface of the strip.

In FIG. 4 of the drawings, the strip S is therefore abraded by the rotating abrading roller 25 and means for rotating it not shown so as to remove a substantial section of the compound bonding the body plies 11 which extend transversely of the strip S with the exposed body ply cords 11 forming a surface pile of appropriate length as indicated by the numeral 27.

In the steps of the method diagrammatically illustrated in FIGS. 3 and 4 of the drawings, means not shown is used to forcibly advance the strip S through the engagement with the respective abrading rollers 23, 24 and 25 or alternately said rollers may be movably mounted for travel longitudinally of the strip S.

Still referring to FIG. 4 of the drawings, a nozzle 28 will be seen by which a state of the art adhesive such as cyanoacrylate or methyl 2-cyanoacrylate may be continuously deposited in a bead 29 on the upper surface of the strip S as the same moves from right to left.

Figure 5:
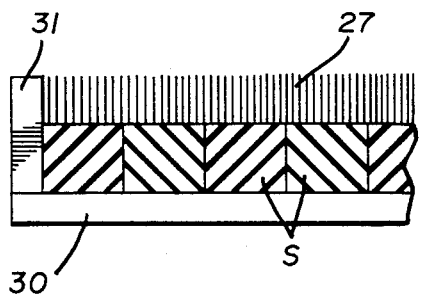
FIG. 5 is a vertical section through an assembly of the strips of tire casing formed in accordance with the invention.
Figure 7:
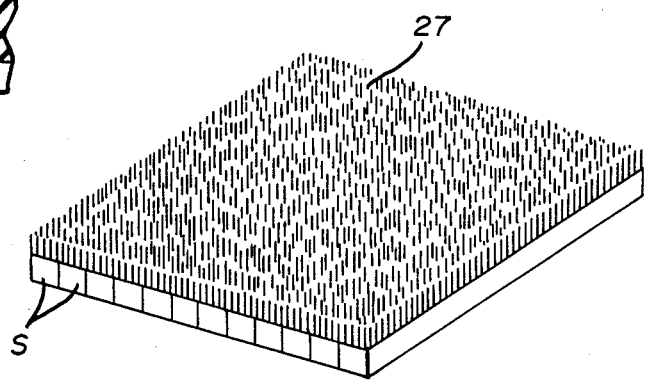
FIG. 7 is a perspective view of a piece of flooring material formed in accordance with the invention whereby all of the side, ends, and bottom surface of the piece of flooring material are of the same rubber and/or resilient material compound of the original body of the used tire casing.
Figure 6:
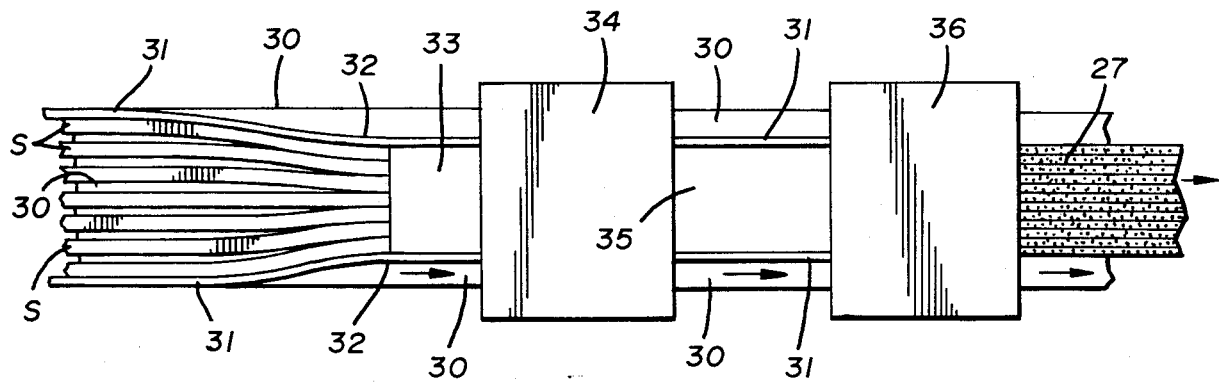
FIG. 6 is a top plan diagrammatic illustration of a device for moving the strips of tire casing as seen in FIG. 5 into close relationship while maintaining them in level relationship, heating the same to insure liquidity of the adhesive and immediately cooling the same to set the adhesive.

A plurality of the strips S are now turned so that the pile 27 forms their upper surface and they are engaged in side by side relation with the bead 29 of the adhesive between the engaged sides which are smooth and are of the same rubber and/or resilient material compound. In FIG. 5 they are illustrated as being so positioned on a flat surface of a conveyor 30 and by referring to the diagrammatic illustration of FIG. 6 it will be seen that the flat conveyor 30 is running from left to right and that is has side guides 31 which are arranged in oppositely disposed relation and which are angled toward one another so as to decrease the effective width from substantially eighteen inches to twelve inches, which is the desired width of the completed assembly of the strips S. The twelve inch width is indicated at 32 in FIG. 6 of the drawings and a cover 33 spaced above the conveyor 31 insures the desirable positioning of the assembled strips S as they move from left to right on the conveyor 30 and in forcefully abutting relationship. They then move into a heating device 34 which heats the assembled strips rapidly to insure complete liquidity and spread of the adhesive bead 29 heretofore referred to and the assembly continues to move to the right through a connecting closed passageway 35 and into a cooling chamber 36 which includes mechanical cooling capable of rapidly cooling the assembled strips S of the finished product which then moves out of the cooling device to the right on the conveyor 30 where the elongated section of flooring material thus formed in a twelve inch width is cut into twelve inch lengths, one of which is shown in perspective in FIG. 7 of the drawings.

It will occur to those skilled in the art that the degree of the exposed body ply cords 11 may be varied and it has been determined that the finished flooring product is highly satisfactory in unusual wear areas when the pile 27 formed of the exposed body ply cords 11 comprises at least a third of the total thickness of the finished flooring. The texture and appearance of the finished product is attractive as the strips S have slightly varying configurations of the exposed body ply cords forming the pile 27. The finished section of flooring is unusually flexible in that there is no stiffening underlaminate as in some of the prior art, the thickness of the body of rubber and/or resilient material forming more or less half of the thickness of the total thickness of the finished flooring enables it to be placed on irregular surfaces over the noses of stair treads and the like which is impossible with the prior art devices and the uniform compound of the material from which the body plies 11 and the pile 27 extend insures the permanent adhesion of the strips in assembled relation to a supporting surface such as a concrete floor or the like.

The flooring material may be applied to uneven floor surfaces over and around the curved edges of treads in large stairways and applied to risers in such stairways as well as to areas of the side walls adjacent thereto due to the thin flexible characteristic of the flooring material formed by the method herein disclosed.

It will thus be seen that an inexpensive, highly practical and extremely durable flooring material is formed by the method herein disclosed and having thus described my invention what I claim is:

1. In a method of making a flooring material from the inner body of a used tire casing having outer and inner sides of an inner body of uniform rubber-like material having body plies incorporating bias or radial cords therein in parallel relation to said outer and inner sides and having belt plies circumferentially thereof and having tread rubber over said belt plies and having an outer layer of rubber-like material on said outer side of said inner body and an inner layer of graphite carbon rubber-like material on said inner side of said inner body; the sequential steps of abrading said used tire casing to remove said tread rubber and belt plies, cutting said abraded casing into two circular parts, cutting each circular part into a continuous spiral strip having four surfaces including a first surface of said outer layer of rubber-like material and an opposite second surface of said inner layer of graphite carbon rubber-like material and abrading said strip to remove said first and second surfaces of rubber-like material and graphite carbon rubber-like material respectively to expose said inner body of uniform rubber-like material, abrading one of the remaining surfaces of said strip to expose the cords of said bias or radial cord plies as a pile on said strip, applying an adhesive to one of said first and second surfaces of said strip, moving a plurality of said strips into parallel assembled adhesive contacting relation with one another, subjecting said plurality of assembled strips to heat to spread said adhesive and immediately cooling said assembled strips to set said adhesive so as to bond said assembled strips to one another and cutting said assembled strips into desirably sized flooring units.

2. The method of making a flooring material from a used tire having a casing with outer and inner sides and a body of resilient material having transverse cord body plies therein and having a belt ply circumferentially thereof and having a resilient tread material on said belt plies and having an outer layer of resilient material on the outer side of said casing and an inner layer of different resilient material on the inner side of said casing; the sequential steps of removing said resilient tread material from said casing, splitting said casing into two halves and cutting a continuous strip from each half with said outer layer of resilient material forming a top surface of said strip and said inner layer of said different resilient material forming a bottom surface of said strip, abrading said top and bottom surfaces of said strip to remove said outer and inner layers of resilient material therefrom so as to form a body wherein said body cord plies lie parallel with said top and bottom surfaces, abrading a side surface of said strip to expose said body ply cords to form a pile on said side of said strip, applying an adhesive to one of said top and bottom surfaces of said strip, assembling a plurality of said strips in parallel relation with said top and bottom surfaces and said adhesive in side by side contacting relation, setting said adhesive, and cutting flooring units from said assembly of strip.

3. The method of making a flooring material of claim 2 including the step following the application of said adhesive, assembling in parallel said plurality of strips on a flat surface and forcing said assembled strips into pressure contact with one another for a known period.

4. The method of claim 2 including the step of moving said strip longitudinally on a flat surface with said outer layer of resilient material on the top of said strip and said inner layer of different resilient material on the bottom of said strip into engagement with abrading rollers for abrading said top and bottom of said strip sufficiently to remove said outer and inner layers.

5. The method of claim 2 including the step of moving said strip longitudinally on a supporting surface with said body cord plies embedded transversely therein into engagement with an abrading roller engaging said transversely embedded body cord plies and removing said resilient material sufficiently to expose said cord plies to a length forming a pile.

* * * * *